US012276125B2

(12) United States Patent
De La Fuente Sanchez

(10) Patent No.: US 12,276,125 B2
(45) Date of Patent: Apr. 15, 2025

(54) SOLAR TENT FOR MEDICAL USES IN THE FIELD

(71) Applicant: Alfonso Fabian De La Fuente Sanchez, Saanich (CA)

(72) Inventor: Alfonso Fabian De La Fuente Sanchez, Saanich (CA)

( * ) Notice: Subject to any disclaimer, the term of this patent is extended or adjusted under 35 U.S.C. 154(b) by 166 days.

(21) Appl. No.: 17/878,801

(22) Filed: Aug. 1, 2022

(65) Prior Publication Data

US 2023/0044577 A1  Feb. 9, 2023

Related U.S. Application Data

(60) Provisional application No. 63/228,836, filed on Aug. 3, 2021.

(51) Int. Cl.
  *E04H 15/02* (2006.01)
  *E04H 15/54* (2006.01)
  *H02J 7/35* (2006.01)

(52) U.S. Cl.
  CPC ............. *E04H 15/02* (2013.01); *E04H 15/54* (2013.01); *H02J 7/35* (2013.01); *B60L 2200/20* (2013.01)

(58) Field of Classification Search
  CPC .................................................... E04H 15/54
  See application file for complete search history.

(56) References Cited

U.S. PATENT DOCUMENTS

| | | | | |
|---|---|---|---|---|
| 4,636,579 A | * | 1/1987 | Hanak | H02S 30/20 136/246 |
| 8,393,581 B2 | * | 3/2013 | Keller | B64G 1/443 244/172.6 |
| 10,396,704 B2 | | 8/2019 | Goodman | |
| 11,083,259 B2 | | 8/2021 | Akin | |
| 11,203,279 B1 | | 12/2021 | Tatro | |
| 11,225,187 B1 | | 1/2022 | Koehler | |
| 11,332,015 B2 | | 5/2022 | Clay | |
| 2004/0261324 A1 | * | 12/2004 | Tewari | E04H 15/42 52/2.18 |
| 2006/0102217 A1 | * | 5/2006 | Hsiang | E04H 15/02 135/92 |
| 2011/0005560 A1 | * | 1/2011 | Nair | H02S 40/36 135/117 |
| 2011/0155196 A1 | * | 6/2011 | Wu | H01L 31/076 135/96 |
| 2012/0137601 A1 | * | 6/2012 | Peelman | E04H 4/10 52/173.3 |
| 2012/0265005 A1 | * | 10/2012 | Han | E04H 3/08 600/21 |
| 2013/0032186 A1 | * | 2/2013 | Lin | E04H 15/58 135/96 |

(Continued)

*Primary Examiner* — Noah Chandler Hawk
(74) *Attorney, Agent, or Firm* — Baumgartner Patent Law; Marc Baumgartner

(57) ABSTRACT

The solar tent comprises a canopy tent with integrated solar panels into the roof of a medical tent design. This technology allows the tent to capture solar energy, and convert it into electrical energy which can then be used to power lights, medical devices, and other equipment. This technology is foldable and collapsible to allow the tent to be both deployed and stored rapidly. The solar tent helps medical professionals overcome the challenges of lack of sufficient electricity while operating from a canopy tent, in the face of COVID-19.

8 Claims, 7 Drawing Sheets

(56) References Cited

U.S. PATENT DOCUMENTS

| | | | |
|---|---|---|---|
| 2013/0153006 A1* | 6/2013 | Cox | H02S 30/20 |
| | | | 136/251 |
| 2013/0169047 A1* | 7/2013 | Omar | E04H 1/1211 |
| | | | 307/11 |
| 2018/0198068 A1* | 7/2018 | Morse | H10K 85/113 |
| 2019/0207552 A1* | 7/2019 | Bodurow | H02S 20/22 |
| 2019/0269246 A1* | 9/2019 | Youngblood | E04H 4/00 |
| 2022/0228564 A1* | 7/2022 | Hermenau | H02S 20/10 |
| 2023/0272639 A1* | 8/2023 | Guo | E04H 15/54 |
| | | | 135/92 |

\* cited by examiner

SOLAR TENT FOR MEDICAL USES IN THE FIELD

CROSS REFERENCE TO RELATED APPLICATIONS

This application claims priority to U.S. Patent Application Ser. No. 63/228,836 filed Aug. 3, 2021, entitled SOLAR COLLECTOR. The above-identified priority patent application is incorporated herein by reference in its entirety.

FIELD

The present technology is an easy to deploy tent with integrated solar panels. More specifically, it is a tent that can power medical equipment and can be easily dismantled for storage or transport without removing the solar panels.

BACKGROUND

United States Patent Application Publication No. 20210162867 discloses a power supply charging system that can be used to power medical equipment in a field tent. It is contemplated that the power charging system may be powered by solar panels. The system comprises: a) a first power cell having electrical energy stored therein; b) a second power cell having electrical energy stored therein, wherein the first power cell and the second power cell are adapted to not be in a discharging mode or a charging mode simultaneously; c) a third power cell in electrical communication with the first power cell and the second power cell, wherein the third power cell is adapted to operably supply power to the first power cell when in the charging mode or the second power cell when in the charging mode; and d) a control system which is adapted to alternate the power being supplied from the third power cell to the first power cell while in the charging mode and the second power cell which in the charging mode based on an occurrence of a pre-determined condition.

SUMMARY

The solar roof canopy tent is used for the health-care industry. COVID-19 has made a negative impact on society and people's health; therefore, a solution is to create a medical canopy tent with an integrated solar roof covering that will help ensure that COVID testing is efficient and safe. The canopy tent's whole point is to create enough electricity to power the medical devices that are available to help COVID-19 positive patients.

The benefits of having a canopy tent are to reduce cross-contamination of viruses and bacteria that might enter into the tent's environment. Therefore, the tent itself has an integrated filtration system that will filter out harmful substances to avoid infected patients from getting ill.

There are numerous COVID-19 testing sites worldwide, and healthcare professionals need more tents with mobile medical devices that can aid the infected people in need. The benefits of solar energy are clean and will not pollute the environment. The solar energy space can still be improved. With the number of materials and resources available for us, solar-powered canopy tents are a possibility that can help aid everyone around the world.

In one embodiment, the solar tent comprises a canopy tent with integrated solar panels into the roof of a medical tent design. This technology allows the tent to capture solar energy and convert it into electrical energy which can then be used to power lights, medical devices, and other equipment. This technology is foldable and collapsible to allow the tent to be both deployed and stored rapidly. The solar tent helps medical professionals overcome the challenges of lack of sufficient electricity while operating from a canopy tent, in the face of COVID-19.

In one embodiment, a foldable medical tent is provided, the foldable medical tent comprising: a flexible material configured in the shape of a tent; a plurality of solar cells embedded in the flexible cloth material; a inverter in electrical communication with the plurality of solar cells; a power storage device in electrical communication with the inverter and configured to electrically communicate with a power consumption device.

In the foldable medical tent, the solar cells may be flexible.

In the foldable medical tent, the plurality of solar cells comprise a perovskite-structured compound.

In the foldable medical tent, the perovskite-structured compound is a halide perovskite.

In the foldable medical tent, the flexible material is a fabric.

In another embodiment, a combination for medical field work is provided, the combination comprising a power consumption device and a foldable medical tent, the foldable medical tent including: a flexible material configured in the shape of a tent; a plurality of solar cells embedded in the flexible cloth material; a inverter in electrical communication with the plurality of solar cells; and a power storage device in electrical communication with the inverter and configured to electrically communicate with the power consumption device.

In the combination, the power consumption device may be one or more of a medical device, a light source, and a heater, which are housed in the folding medical tent.

In the combination, the solar cells may be flexible.

In the combination, the plurality of solar cells may comprise a perovskite-structured compound.

In the combination, the perovskite-structured compound may be a halide perovskite.

In the combination, the flexible material may be a fabric.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
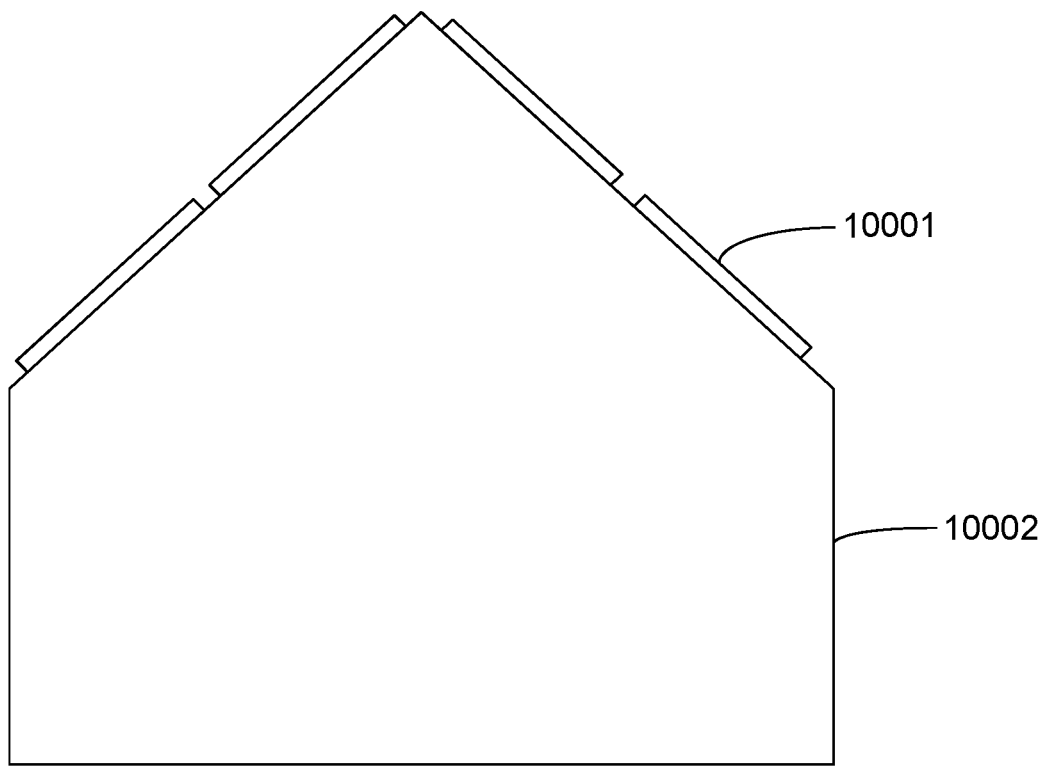
FIG. 1 is an embodiment of a tent with embedded solar panels.

FIG. 1 shows a side view of a tent (10002) with solar panels (10001) that are embedded on the tent itself. The solar panels (10001) are made of perovskite material and allow sunlight to be harvested into energy.

Figure 2:
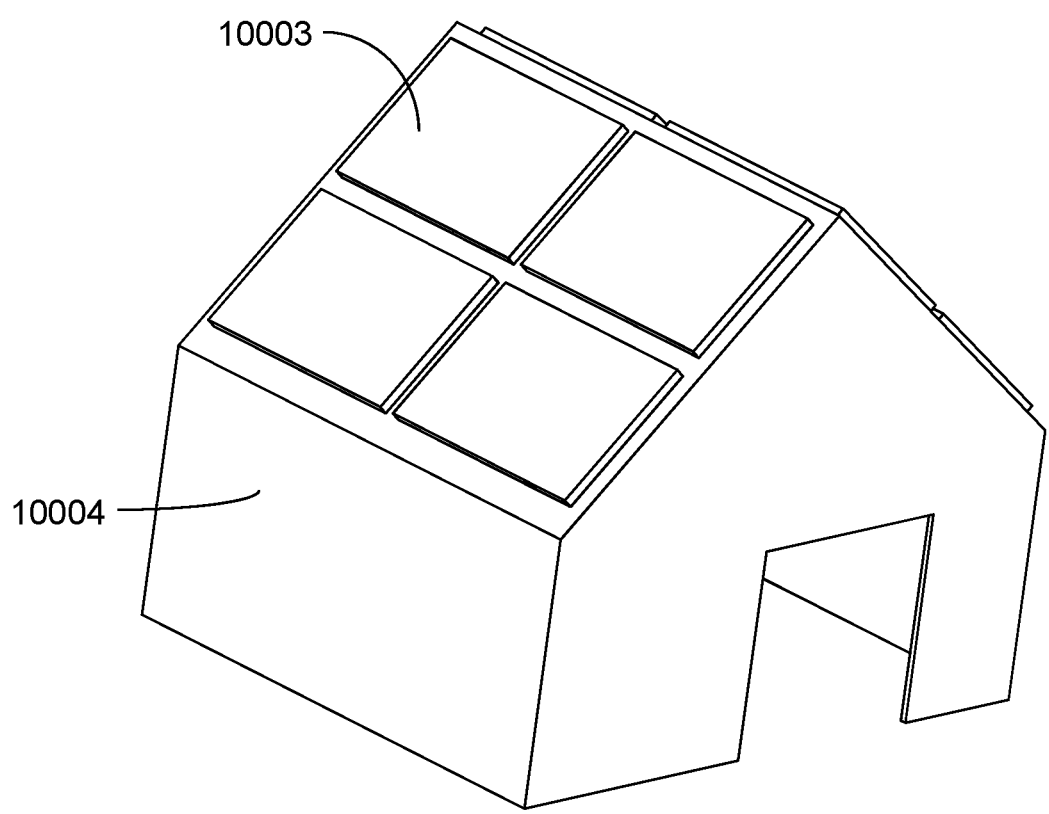
FIG. 2 shows a different view of the embodiment of a tent with embedded solar panels.

FIG. 2 shows a top perspective view of one embodiment of the technology where one can see the tent (10004), along with four solar panels (10003) embedded on the roof of the tent. The location of the panels is so that the tent can be positioned in a variety locations and directions and still be able to generate enough energy. One familiar with the art will appreciate that the solar panels could not only be embedded in the top portion of the tent, but also on the sides.

Figure 3:
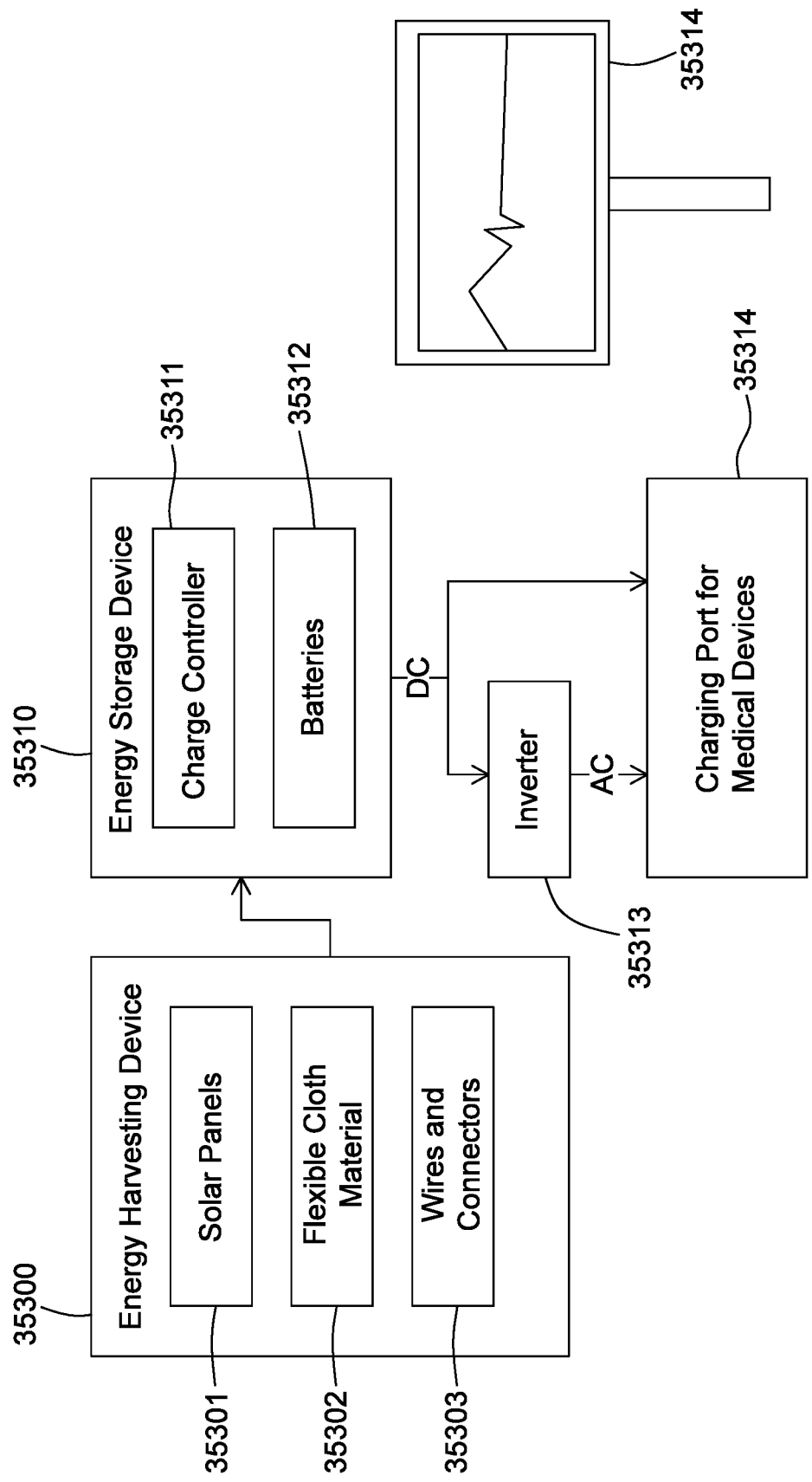
FIG. 3 is a diagram of an energy harvesting device.

FIG. 3. shows a diagram of an energy harvesting device (35300) comprising one or more solar modules (35301) on a flexible cloth backing (35302) with wires and connectors (35303) that transport the energy to an energy distribution system also known as the energy storage device (35310). The energy harvesting device is installed on the tent's roof. The energy harvesting device is connected to an energy storage device (35310) consisting of a charge controller (35311) and a battery (35312), where the output of the energy storage device is connected to a grid that distributes the energy. The energy to be used at one or more of the group of medical devices, air filtration system, light sources, and heaters for the tent's room. In another form of the technology, the energy storage device is connected to an inverter (35313) to provide AC energy for the medical equipment (35314).

The purpose of a medical tent, or a medical field tent, is to have a way of rapidly deploying a medical station with low infrastructure requirements. The medical station's purpose is also to provide a shaded area, privacy and a place to house medical equipment. Medical equipment needs electricity to run, and it may be difficult to connect the grid in these rapidly deployed field hospitals. Generators can be used, but the downside is the noise that the generators produce, and the greenhouse gases that they produce.

This technology integrates photovoltaic (PV) solar panels into the medical tent design. This would allow the tent to autonomously generate energy to power lights and medical devices and equipment. This technology is foldable and collapsible to allow the tent to be both deployed and stored rapidly.

A solar cell, or photovoltaic cell converts the energy of light directly into electricity by the photovoltaic effect, which is a physical and chemical phenomenon. It is a type of photoelectric cell, and can be defined as a device whose electrical characteristics, such as current, voltage, or resistance, vary when exposed to light. Individual solar cell devices can be combined to form modules, otherwise known as solar panels. Solar cells are described as being photovoltaic, irrespective of whether the source is sunlight or an artificial light.

The operation of a photovoltaic (PV) cell requires three basic attributes. The first attribute is the absorption of light, generating electron-hole pairs or excitons. Second, the separation of charge carriers of opposite types. Lastly, it requires the separate extraction of those carriers to an external circuit. In contrast, a solar thermal collector supplies heat by absorbing sunlight, for the purpose of either direct heating or indirect electrical power generation from heat. A "photo electrolytic cell" (photoelectrochemical cell), on the other hand, refers either to a type of photovoltaic cell (like that developed by Edmond Becquerel and modern dye-sensitized solar cells), or to a device that splits water directly into hydrogen and oxygen using only solar illumination.

One familiar with the art will appreciate that the energy capturing layer is at least 75% perovskite, wherein a perovskite solar cell (PSC) is a type of solar cell which includes a perovskite-structured compound, most commonly a hybrid organic-inorganic lead or tin halide-based material, as the light-harvesting active layer. Perovskite materials, such as methylammonium lead halides and all-inorganic caesium lead halides, are cheap to produce and simple to manufacture. In one embodiment, halide perovskites are employed.

The other components of a PV system for use in medical field tents is the charge controller and a battery. In another version of the technology, there are PV panels, a charge controller, a battery and an inverter.

The battery is a device that allows energy to be stored chemically. There are several types of batteries used in PV systems, including, but not limited to: flooded lead acid, valve-regulated lead-acid, lithium ion, nickel Iron and lithium nickel cobalt batteries.

The charge controller regulates the amount of charge that the batteries get from the PV system. Charge controllers are an important part of battery systems as they allow the batteries to not be overcharged and damaged, and also charged at the correct current and voltage.

An inverter is a device that converts direct current (DC) into alternating current (AC). This allows the DC energy that the PV panels produce to be converted into AC energy to be used by the grid, or by commonly used houses.

One familiar with the art will appreciate that the tent's design is woven in a special fabric that allows solar panels to be embedded thereof to allow sunlight shine down to the panels to collect energy for electricity.

Figure 4:
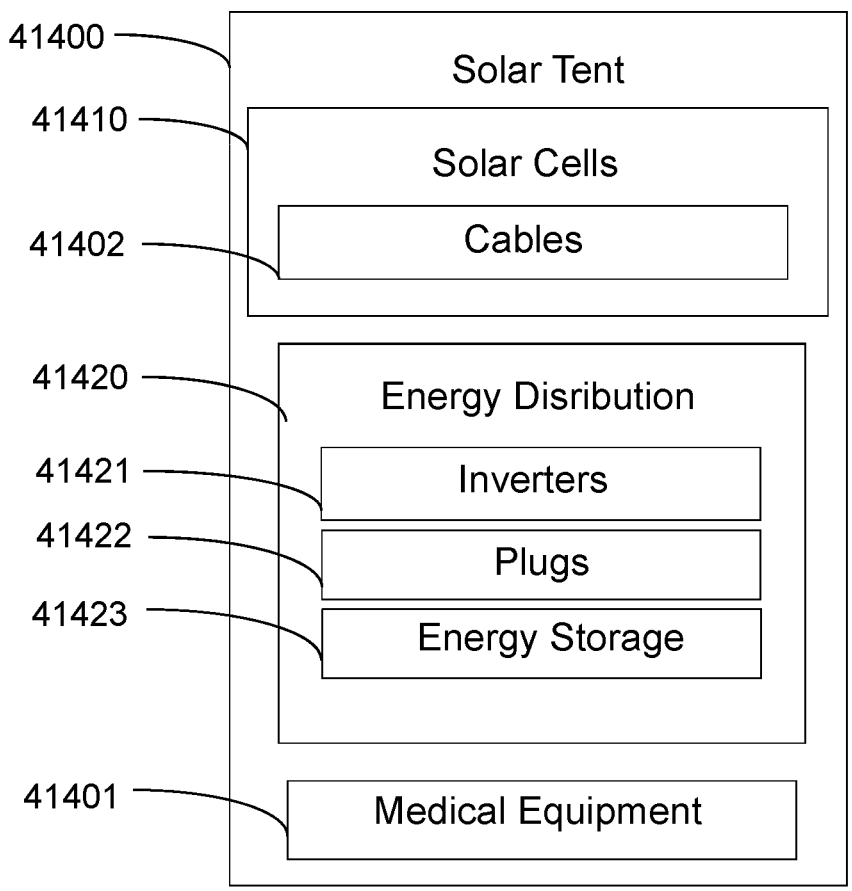
FIG. 4 shows a block diagram showing the functionality of the solar tent.

FIG. 4 shows a block diagram showing the functionality of the solar tent (41400) and its interaction with medical equipment (41401). A solar tent (41400) that acts as a shelter for people and medical equipment has on at least one of its sides or top solar cells (41410) as described in the FIGs above. The solar tent (41400) has cables (41402) that operationally connect the solar cells (41410) to a power distribution system (41420) that comprises inverters (41421), plugs (41422) and energy storage units (41423) from the group of battery banks or battery cells. One familiar with the art will appreciate that the medical equipment can be one or more from the group of defibrillator, blood pressure monitors, life signal monitors, thermometers, lightning equipment, clocks, ultrasound, specialized diagnostic equipment, diagnostic tools and specialized treatment equipment to name a few.

Figure 5:
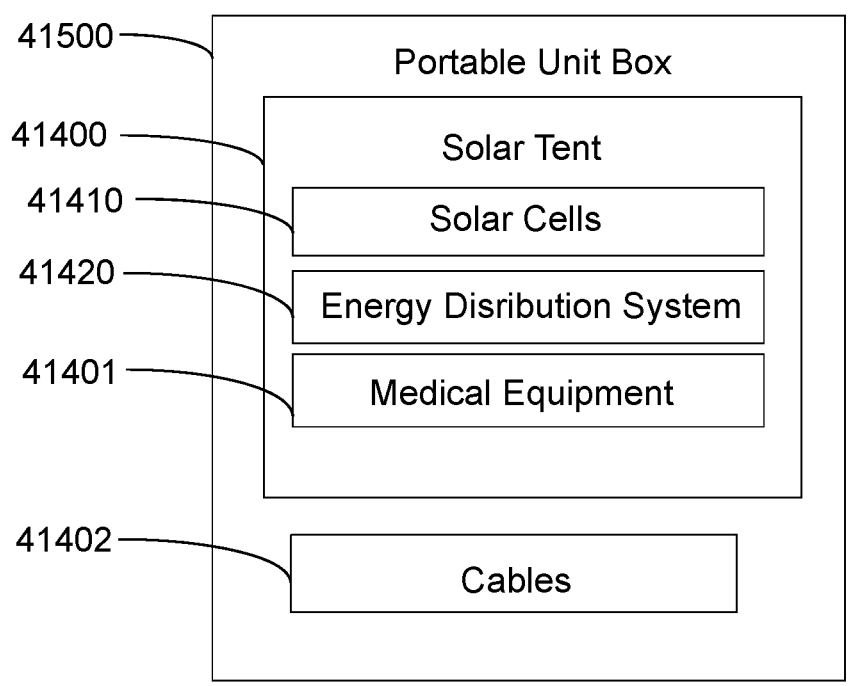
FIG. 5 shows a different embodiment of our technology where the solar tent is part of a portable unit box.

FIG. 5 shows a different embodiment of our technology where the solar tent (41400) is part of a portable unit box (41500) that comprises the solar tent (41400) with solar cells (41410), an energy distribution system or kit (41420) and medical equipment (41401), wherein the solar tent (41400) is an integral part of the portable unit box (41500) as it is mechanically connected to it via cables (41402). One familiar with the art will appreciate that medical teams can carry the portable unit box (41500) to remote locations and then deploy the box by taking the solar tent out which will serve as shelter for the humans and for the portable unit box, which houses the power distribution system and the medical equipment needed.

Figure 6:
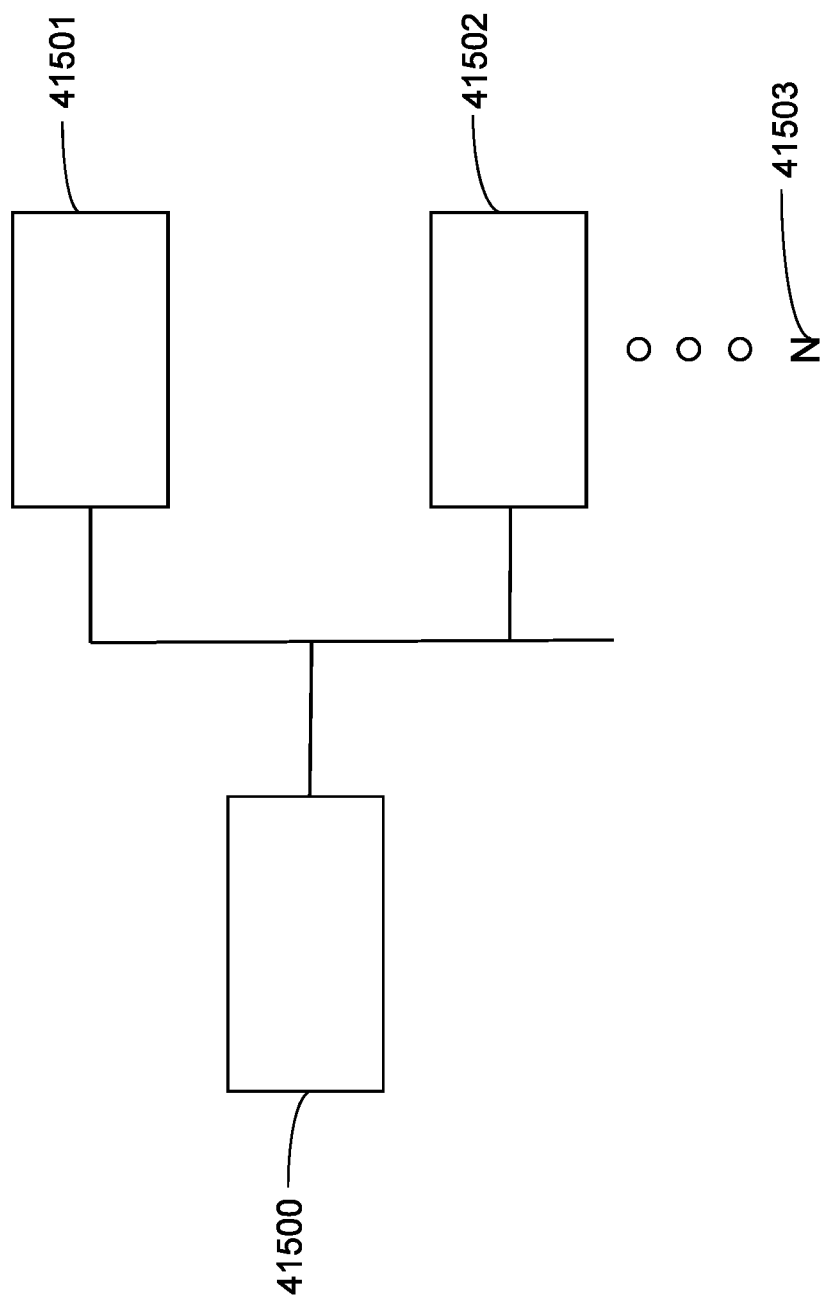
FIG. 6 shows a different embodiment of the technology where the portable unit box is mechanically and operatively connected to other portable unit boxes.

FIG. 6 shows a different embodiment of the technology where the portable unit box (41500) is mechanically and operatively connected to other portable unit boxes (41501, 41502, 41503) that may comprise other solar tents (41400) or extra medical equipment.

Figure 7:
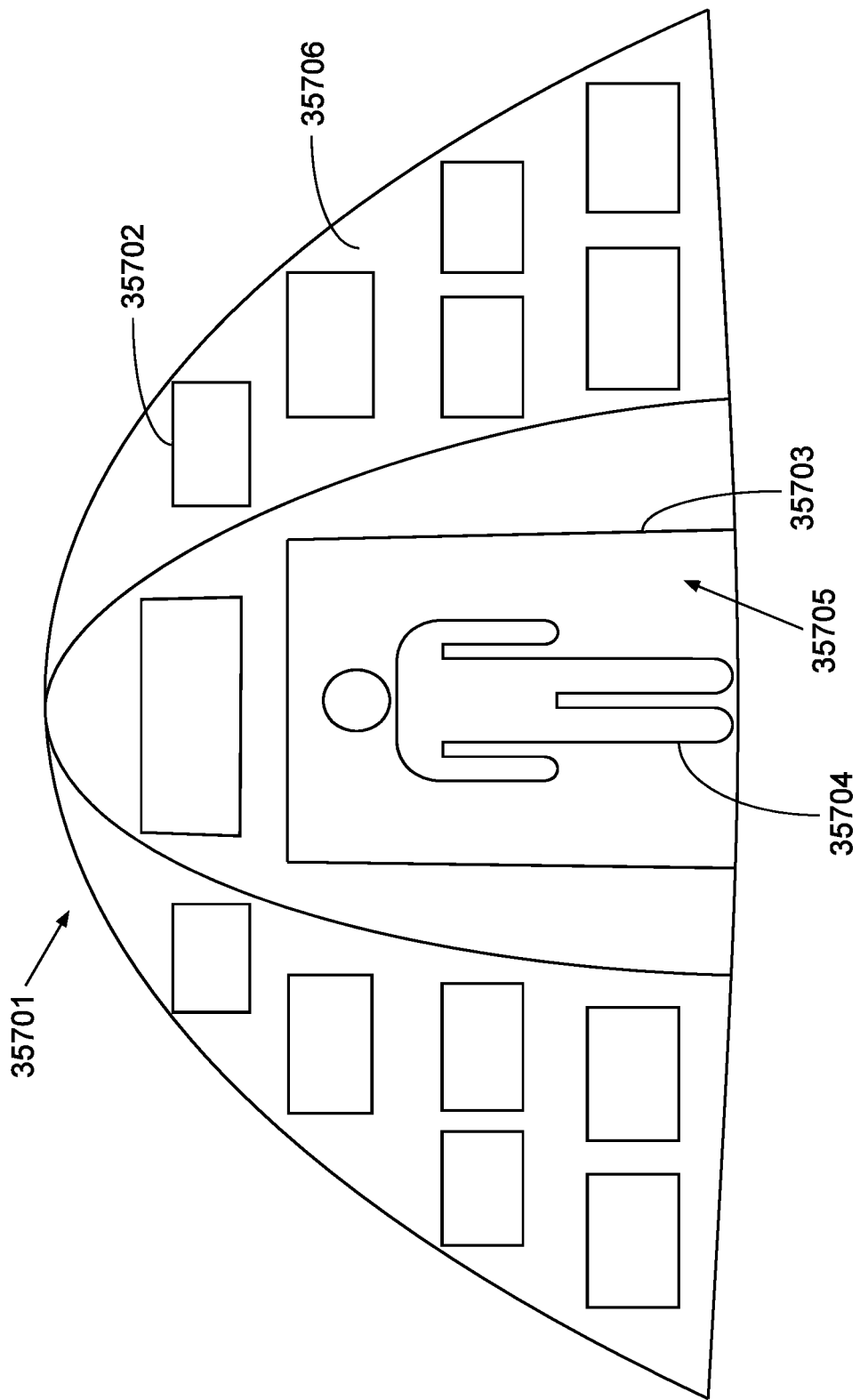
FIG. 7 shows a front view of a second embodiment of the technology, a tent in the form of a dome

FIG. 7 shows a front view of a second embodiment of the technology, a tent in the form of a dome (35701), wherein the dome is retractable and it is made of a fabric or flexible material, wherein each section of the dome (35706) has solar cells (35702), wherein each solar cell is flexible. In another embodiment, the solar cells are rigid. In yet another embodiment, the solar cells are hybrid, wherein the hybrid solar cell is a solar cell comprising multiple cell modules that are either flexible or rigid, however, due to the size of the cells relative to the size of the dome section the dome section can be flexible enough to form the dome section accordingly as needed to complete the dome. Continuing with the description of FIG. 7, the tent in a form of a dome has a door or an open section (35703) where a person (35704) can walk into the inside of the dome, wherein in the inside of the dome one can install medical equipment (35705). One familiar with the art will appreciate that the tent in the form of a dome can be retractile and be packed, making it portable. In a different embodiment of the technology the tent in the form of a dome can be stored together with the medical equipment and the energy distribution and storage system as described in the FIGs above inside a box or a pack. In a different embodiment of the technology the box or pack also stores the medical equipment for transportation together with the tent in the form of a dome.

In a different embodiment of the technology, the tent in the form of a dome is made of separate sections that, when put together, form the dome.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A combination for medical field work, the combination consisting of a power consumption device, a portable box and a foldable medical tent, which is integral with the portable box, the foldable medical tent including: a flexible cloth material configured in the shape of a tent; a plurality of solar cells embedded in the flexible cloth material wherein each solar cell of the plurality of solar cells is flexible; a power storage device in electrical communication with the plurality of solar cells; an inverter in electrical communication with the power storage device and configured to electrically communicate with the power consumption device, wherein the portable box is configured to house the foldable medical tent when folded.

2. The combination of claim 1, wherein the plurality of solar cells comprise a perovskite-structured compound.

3. The combination of claim 2, wherein the perovskite-structured compound is a halide perovskite.

4. The combination of claim 3, wherein the flexible cloth material is a woven fabric.

5. A portable box, the portable box consisting of a box, medical equipment housed in the box, a solar tent which is integral with the box, the solar tent including a flexible cloth material configured in the shape of a tent and a plurality of solar cells embedded in the flexible cloth material wherein each solar cell of the plurality of solar cells is flexible and an energy distribution system that is housed in the box and is in electrical communication with the solar cells and the medical equipment.

6. The combination of claim 5, wherein the plurality of solar cells comprise a perovskite-structured compound.

7. The combination of claim 6, wherein the perovskite-structured compound is a halide perovskite.

8. The combination of claim 7, wherein the flexible cloth material is a woven fabric.

* * * * *